(12) United States Patent
Shibayama

(10) Patent No.: US 7,755,823 B2
(45) Date of Patent: Jul. 13, 2010

(54) OPTICAL DEVICE, SEMICONDUCTOR LASER MODULE, OPTICAL SCANNING DEVICE, AND IMAGE FORMING APPARATUS

(75) Inventor: Yasuyuki Shibayama, Hitachinaka (JP)

(73) Assignee: Ricoh Company, Tokyo (JP)

(*) Notice: Subject to any disclaimer, the term of this patent is extended or adjusted under 35 U.S.C. 154(b) by 255 days.

(21) Appl. No.: 11/937,820

(22) Filed: Nov. 9, 2007

(65) Prior Publication Data

US 2008/0144151 A1 Jun. 19, 2008

(30) Foreign Application Priority Data

Dec. 14, 2006 (JP) ............................. 2006-337281

(51) Int. Cl.
G02B 26/08 (2006.01)
(52) U.S. Cl. .................................. 359/205.1
(58) Field of Classification Search ................... 385/14, 385/31–38, 88–94; 398/200; 257/98, 100; 359/205.1
See application file for complete search history.

(56) References Cited

U.S. PATENT DOCUMENTS

| | | | | |
|---|---|---|---|---|
| 5,804,330 A | * | 9/1998 | Miyazaki et al. | 429/48 |
| 2004/0213130 A1 | * | 10/2004 | Kataoka et al. | 369/112.01 |
| 2007/0058908 A1 | | 3/2007 | Shibayama et al. | |

FOREIGN PATENT DOCUMENTS

| | | | |
|---|---|---|---|
| JP | 60-111201 | | 6/1985 |
| JP | 07-147457 | | 6/1995 |
| JP | 08-213678 | | 8/1996 |
| JP | 08-236660 | | 9/1996 |
| JP | 11-054852 | | 2/1999 |
| JP | 2002-544679 | | 12/2002 |
| JP | 2003101116 A | * | 4/2003 |
| JP | 2003-257821 | | 9/2003 |
| JP | 2004-253783 | | 9/2004 |
| JP | 2006165194 A | * | 6/2006 |
| JP | 2007-73870 | | 3/2007 |

OTHER PUBLICATIONS

Ashkin et al. (1986) "Observation of a single-beam gradient force optical trap for dielectric particles," *Optics Letters* 11 (5): 288-290.

* cited by examiner

*Primary Examiner*—Euncha P Cherry
(74) *Attorney, Agent, or Firm*—Morrison & Foerster LLP

(57) ABSTRACT

An optical device is disclosed in which inner space is kept clean so as to reduce the adhesion and adsorption of pollutants to the surface of the optical device, thereby preventing the degradation of the optical device and accurately maintaining the alignment of the coupling between the laser light from a semiconductor laser and the incident end surface of an optical fiber. The optical device includes a lens system unit condensing the laser light emitted from the semiconductor laser and guiding the laser light onto an incident end of the optical fiber; a variable volume mechanism unit defining an hermetically enclosed space; and an adsorbent unit disposed in the hermetically enclosed space, in which either the incident end of the optical fiber or the lens system unit or both are in contact with the hermetically enclosed space containing the adsorbent unit.

18 Claims, 5 Drawing Sheets

OPTICAL DEVICE, SEMICONDUCTOR LASER MODULE, OPTICAL SCANNING DEVICE, AND IMAGE FORMING APPARATUS

BACKGROUND OF THE INVENTION

1. Field of the Invention

The present invention relates to an optical device, a semiconductor laser module, an optical scanning device, and an image forming apparatus.

2. Description of the Related Art

Semiconductor laser devices have been used in various applications. Particularly, a large number of small-size semiconductor laser devices have been used in the optical communication field and in image forming apparatuses such as printers. In some semiconductor laser devices, a laser light emitted from the light-emitting part directly irradiates an optical system. However, in typical light scanning devices using many laser lights, laser lights are guided by means of optical fibers and emitted from the ends of optical fibers into the light scanning devices. This method serves to enhance the flexibility of arranging the semiconductor laser light source devices, thereby facilitating the design and manufacturing of the image forming apparatus including the light scanning device.

The combination including a semiconductor laser, an optical device coupling the laser light emitted from the semiconductor laser with an optical fiber, and the coupled optical fiber is called a semiconductor laser module. Semiconductor laser modules in which a laser light emitted from the semiconductor laser is effectively coupled with a single-mode optical fiber are widely used especially in the optical communication field. Generally, the core diameter of a single-mode optical fiber decreases as the oscillating wavelength of the semiconductor laser decreases. Namely, when a visible light semiconductor laser is used, the core diameter becomes several micrometers. Because of this feature, when a visible light is used in a semiconductor laser module, alignment between an incident light beam into an optical fiber and the optical fiber has to be performed much more accurately, and much higher structural stability of the module against environmental changes occurring after the manufacture of the module is also required compared with a case where an infrared light is used in a semiconductor laser module.

Further, since the incident end surface of the optical fiber in the semiconductor laser module is always irradiated by the laser light condensed into a spot of several micrometers, the optical energy density is focused on the incident end surface of the optical fiber. Under this circumstance, due to the optical tweezer effect (an effect of collecting dust on a light condensing point, see Non Patent Document 1), dust is disadvantageously adhered on the core portion of the end of the optical fiber. Unfortunately, in addition to the optical tweezer effect, with a short-wavelength laser having wavelength of 450 nm or less, the adhered dust and ambient gas easily produce a photochemical reaction with the laser light, thereby increasing the pollution of the light condensing part of the optical fiber.

Patent Document 1 describes the major pollutants of concern. One pollutant is generated by copolymerizing or decomposing the hydrocarbon gas, having intruded from the atmosphere during a manufacturing process, by reacting with the laser light. Another pollutant is siloxane floating in air, causing a photochemical reaction with laser light to generate $SiO_x$ that accumulates on and adheres to the light condensing part of the optical fiber. Because of this disadvantage, the exchange of a member possibly polluted is suggested.

According to, for example, Patent Documents 2 through 5, a method is provided in which a getter formed of a porous material or an organic adsorption agent is housed in the semiconductor laser module to adsorb pollutants such as an adhesive, a detergent, and flux for soldering that are used in a process of manufacturing a semiconductor laser module.

According to Patent Document 6, it is suggested that the package of the semiconductor laser module be hermetically sealed using flux-free solder or an adhesive free from silica-based organic matter or by way of fusion bonding or welding to prevent intrusion of pollutants into the package of the semiconductor module, thereby reducing the pollution of the incident end surface of the optical fiber.

On the other hand, to prevent the intrusion of impurities into the package of a semiconductor laser module, it is also suggested that an hermetically enclosed space be provided in the package. However, when, for example, the environment changes, an optical system in the semiconductor laser module may be distorted due to the pressure change in the package. The higher the required accuracy of condensing the light becomes, the more easily the efficiency of guiding the light fluctuates due to the distortion between the condensing light portion of the end surface of the optical fiber and the lens system of the laser chip and the optical system, thereby causing trouble in a subsequent process of the image forming apparatus.

To reduce the pressure change, Patent Document 7 discloses an optical device having a case whose volume can be changed. The optical device includes a case, made of a material that is not substantially deformed, having an opening and an elastic member, having a larger size than that of the opening, disposed on the opening. Because of this structure, when the volume of the case is changed, the volume of the elastic body is changed.

Patent Document 8 discloses an optical device having a variable volume mechanism changing a volume of the space on a light path. The variable volume mechanism enables maintaining the pressure of the space and, therefore, reduces the displacement or the deformation of the optical member when the amount of gas supplied into the optical device is changed.

Patent Document 1: Japanese Patent Application Publication No: H11-54852
Patent Document 2: Japanese Patent Application Publication No: H07-147457
Patent Document 3: Japanese Patent Application Publication No: H08-213678
Patent Document 4: Japanese Patent Application Publication No: H08-236660
Patent Document 5: Japanese Patent Application Publication No: 2002-544679
Patent Document 6: Japanese Patent Application Publication No: 2004-253783
Patent Document 7: Japanese Patent No: H03-27081
Patent Document 8: Japanese Patent Application Publication No: 2003-257821
Non Patent Document 1: Ashkin et al.: Observation of a single-beam gradient force optical trap for dielectric particles. Opt Lett. 11, PP. 288-290, 1986

In the inventions described in Patent Documents 2 through 6, since an optical fiber coupling system is completely isolated from outer air, the following problems may occur:

(1) When a semiconductor laser module is used at high or low altitude, the pressure difference between outer air and inside air deforms the optical fiber coupling system, thereby changing the amount of light guided into the optical fiber.

(2) When the pressure difference occurs between inside a semiconductor laser module and outer air, there is a danger that gas causing pollution may intrude through an incompletely sealed portion of the optical fiber coupling system.

(3) When humidity of outer air is high, moisture may intrude through an incompletely sealed portion of the optical fiber coupling system; condensation may be formed, thereby reducing the light use efficiency of the optical fiber coupling system.

Further, an object of Patent Document 7 is to provide a variable focal-distance optical device capable of changing the focal distance by treating the surface of the elastic member as the optical surface. But, the Patent Document 7 does not provide any specific suggestion with regard to the problem of the deformation of the optical system when the volume of the case is changed.

Also, the variable volume mechanism provided in Patent Document 8 moves slidably or elastically. There is, however, no description of the service life of the filter.

SUMMARY OF THE INVENTION

The present invention is made in light of the above problems and may provide an optical device in which inner space is kept clean so as to reduce the adhesion to and adsorption of pollutants on the surface of the optical device, thereby preventing the degradation of the optical device. Further, the present invention may provide an optical device in which the alignment of the coupling between the laser light from the semiconductor laser and the incident end surface of the optical fiber is accurately maintained. Still further, the present invention may provide a semiconductor laser module including the optical module, an optical scanning device including the optical module, and an image forming apparatus including the optical scanning device.

To solve the above problems, the inventor of the present invention has intensively studied and completed the invention described below.

According to one aspect of the present invention, there is provided an optical device including a lens system unit condensing a laser light emitted from a semiconductor laser and guiding the laser light onto an incident end of an optical fiber; a variable volume mechanism unit defining an hermetically enclosed space; and an adsorbent unit disposed in the hermetically enclosed space, in which either the incident end of the optical fiber or the lens system unit or both are in contact with the hermetically enclosed space including the adsorbent.

According to another aspect of the present invention, there is provided the optical device in which the hermetically enclosed space includes a first space defined by either the incident end of the optical fiber or the lens system unit or the both and a second space defined by the variable volume mechanism unit and the first space and the second space are separated by the adsorbent unit.

According to still another aspect of the present invention, there is provided the optical device in which the variable volume mechanism unit is a wall surface made of a flexible or an elastic member and the wall surface defines the hermetically enclosed space.

According to still another aspect of the present invention, there is provided the optical device in which the flexible or elastic member is a sealing tape.

According to still another aspect of the present invention, there is provided the optical device in which the sealing tape is made of polyethylene terephthalate (PET) or a laminated body including PET and aluminum.

According to still another aspect of the present invention, there is provided the optical device in which the flexible or the elastic member is attached to a wall surface defining the hermetically enclosed space with a silicon-free adhesive.

According to still another aspect of the present invention, there is provided the optical device in which the adsorbent unit adsorbs a trace impurity decomposed by or reacted with the laser light in the hermetically enclosed space.

According to still another aspect of the present invention, there is provided the optical device in which the adsorbent unit adsorbs gas decomposed or reacted to generate carbons or a carbon compound.

According to still another aspect of the present invention, there is provided the optical device in which the adsorbent unit adsorbs silicon compound gas.

According to still another aspect of the present invention, there is provided the optical device in which the adsorbent unit has a dehumidification function.

According to still another aspect of the present invention, there is provided the optical device in which the adsorbent unit includes activated carbons or activated carbons containing a dehumidification agent.

According to still another aspect of the present invention, there is provided the optical device in which the adsorbent unit is contained in a case having air permeability.

According to still another aspect of the present invention, there is provided the optical device further including a laser holder holding the semiconductor laser; an optical fiber holder having a ferrule holding the optical fiber; and a sleeve holding the ferrule.

According to still another aspect of the present invention, there is provided a semiconductor laser module including a semiconductor laser; an optical fiber; and the optical device condensing a laser light emitted from the semiconductor laser and guiding the laser light onto the incident end of the optical fiber.

According to still another aspect of the present invention, there is provided the semiconductor laser module in which a laser light emitting section and the optical device are formed into an integrated structure.

According to still another aspect of the present invention, there is provided the semiconductor laser module in which the wavelength of the laser light emitted from the semiconductor laser is 450 nm or less.

According to still another aspect of the present invention, there is provided an optical scanning device including an optical fiber array unit in which plural laser light output ends of the optical fibers from the semiconductor laser module are arranged; an optical deflection device deflecting and scanning the laser lights emitted from the optical fiber array; a scanning optical system unit scanning and forming an image on a scanning surface from the laser lights deflected and scanned by the optical deflection device; and the semiconductor module.

According to still another aspect of the present invention, there is provided an image forming apparatus including the optical scanning device.

In an optical device according to an embodiment of the present invention, inner space is kept clean so as to reduce the adhesion and adsorption of pollutants onto the surface of the optical device, thereby preventing the degradation of the optical device. Also, the alignment of the coupling between the laser light from the semiconductor laser and the incident end surface of the optical fiber is accurately maintained. Further, a semiconductor laser module including the optical module, an optical scanning device including the optical module, and an image forming apparatus including the optical scanning device can receive stable laser light from an optical fiber coupled with the optical device, thereby obtaining higher stability and longer service life.

DETAILED DESCRIPTION OF THE PREFERRED EMBODIMENTS

Exemplary embodiments of the present invention are described below.

Embodiment 1

Figure 1:
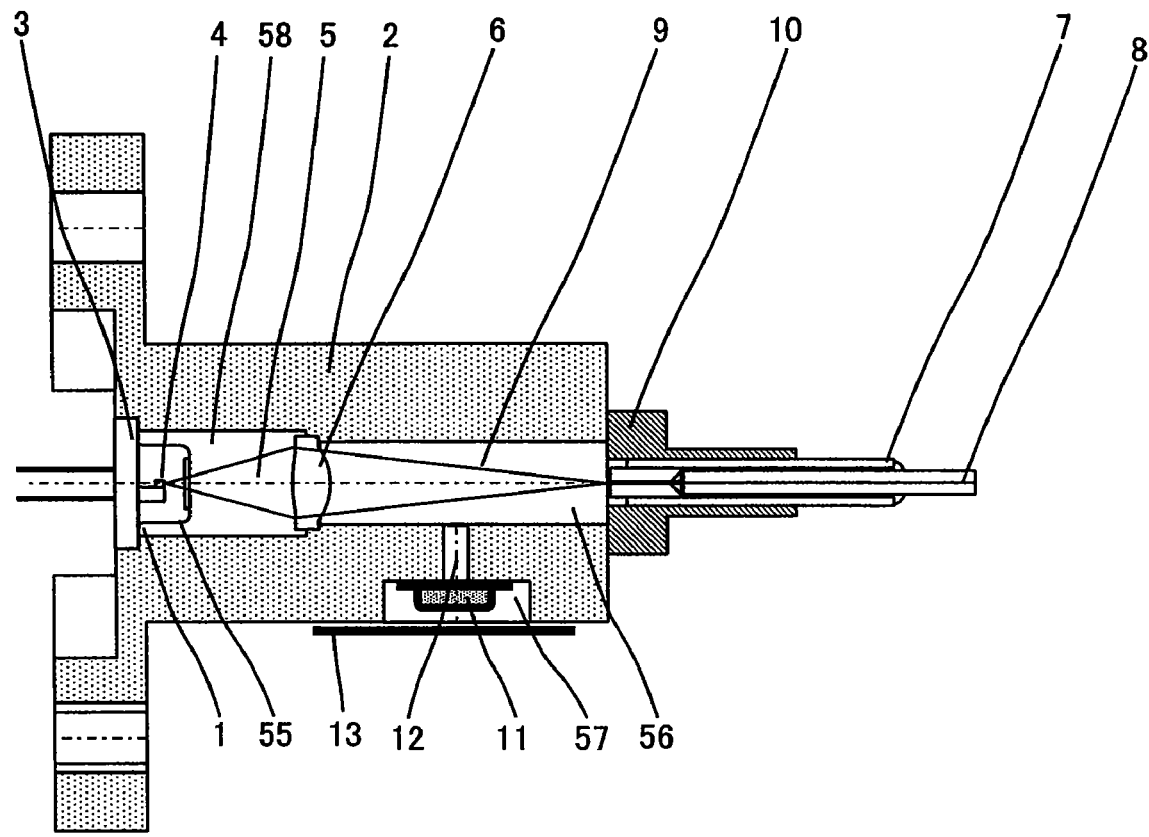
FIG. 1 is a cut-away view of an exemplary semiconductor laser module according to an embodiment of the present invention.

FIG. 1 is a cut-away view showing an exemplary semiconductor laser module including an optical device, a semiconductor laser, and an optical fiber. The structure and the function of the semiconductor laser module are described. The semiconductor laser 1 used as a light source, having an integrated structure, includes a laser chip 4 emitting a laser light, an optical detection device (not shown) receiving the laser light, a stem 3, and a LD cap 55. The stem 3 and the LD cap 55 are air-tightly joined to each other, housing the laser chip 4 and the optical detection device in a clean inert gas atmosphere. The stem 3 of the semiconductor laser 1 is air-tightly joined with a laser holder 2 used as a case housing a lens system 6 of the optical device. As the laser chip 4 of the semiconductor laser 1, a blue semiconductor laser having wavelength of 405 nm is used.

A laser light 5 emitted from the laser chip 4 in a light-emitting part of the semiconductor laser 1 is condensed, by means of a lens system 6 arranged inside the laser holder 2, on the incident end surface of a single-mode optical fiber 8 and made incident on the end surface of a light propagation region (hereinafter referred to as "core") of the optical fiber 8. The optical fiber 8 is held by a ferrule 7 and the ferrule 7 is held by a sleeve 10 joined with the laser holder 2.

To effectively guide an optical fiber irradiating light 9 into the optical fiber 8, it is desired to adjust the size of the light condensing spot of the optical fiber irradiating light 9 to fit the size of the cross section of the core of the optical fiber 8. To that end, it is necessary to adjust the size of the light-emitting part of the laser chip 4 to fit the core diameter of the optical fiber 8. Also, the magnification of the lens system 5 (generally assorted lenses) is required to be determined based on the sizes of the light-emitting part of the laser chip 4 and the core diameter.

Typically, the size of the light-emitting part of the laser chip 4 is approximately 0.5 to 2 μm. Further, when a single-mode optical fiber for a visible light is used, the size of the core diameter becomes very small, as low as 4 to 5 μm. Because of this, when an optical fiber is coupled with the lens system to manufacture a semiconductor laser module, a high-precision optical laser alignment system is used to adjust the condensing point of the optical fiber irradiating light 9 to fit the core of the optical fiber 8 with an accuracy less than one micrometer so that the optical fiber irradiating light 9 be effectively guided into the optical fiber 8. To manufacture the semiconductor module, first, the optical fiber irradiating light 9 is adjusted to fit the core of the optical fiber 8. Then, the optical fiber 8 is held by the ferrule 7 and the ferrule 7 is held by the sleeve 10. Further, the sleeve 10 is air-tightly joined with the laser holder 2. As described above, preferably, joining sections between the semiconductor laser 1 and the optical device and between the optical device and the optical fiber are air-tightly sealed with each other to form an integrated structure.

In the optical device according to the embodiment of the present invention, as shown in FIG. 1, there are provided spaces 56 through 58. The space 58 is defined by the laser holder 2, the lens system 6, and the stem 3 holding the laser light emitting end covered with the LD cap 55. The space 56 is defined by the laser holder 2, the lens system 6, and the sleeve 10 including the light-incident end of the optical fiber 8. The space 57 is defined by the laser holder 2, a sealing tape 13, and a sheet 20 (see FIG. 3) at the bottom of an adsorbent 11. The spaces 56 through 58 are in communication with each other so that gas may flow from one space to another space, but are isolated from the outside of the module. The space 56 where the laser light propagates in the optical device and the space 57 provided in a part of the laser holder 2 are in communication with each other via an air hole 12 and the adsorbent 11. The space 57 is isolated from the outside of the module by the sealing tape 13.

Figure 3:
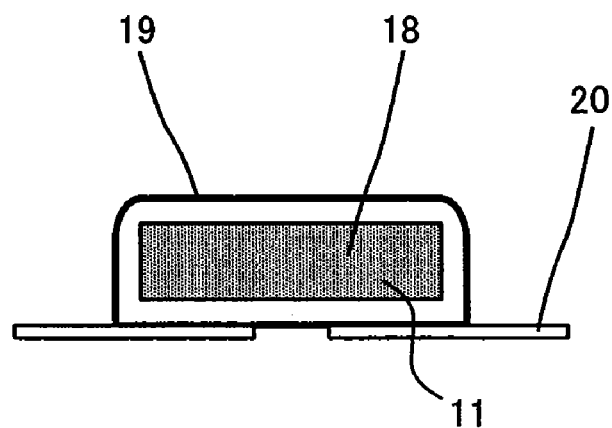
FIG. 3 is a cut-away view of an exemplary adsorbent used in the semiconductor laser module.

FIG. 3 is a cut-away view of the adsorbent 11 including a container 19 made of a porous fluorine sheet having submicron micropores and an adsorptive material 18 having activated carbons, covered with the container 19. The adsorption characteristics of the activated carbons may be changed so as to adsorb a desired material by designing the surface structure of the activated carbons. For example, when usual activated carbons are treated with alkali, the performance of adsorbing an acid material can be enhanced. By using the feature, organic gas and inorganic gas can also be adsorbed by, for example, the surface structure design, the activation treatment, and the surface treatment of the activated carbons. Especially, the performance of adsorbing silicon compound gas can also be enhanced. Preferably, the adsorbent 11 adsorbs impurity gas included in the hermetically enclosed spaces 56, 57, and 58, the gas generating a material decomposed by or reacted with a laser light to generate a material adhered to the optical device and the optical fiber as an impurity, the gas being decomposed by or reacted with a laser light to generate carbons, a carbon compound, and especially a liquid or solid carbon compound. Further, when a hygroscopic material is mixed into the adsorbent 11, it is possible to reduce the moisture in the spaces 56 through 58. In addition to the adsorbent including activated carbons, a known adsorbent for adsorbing gas including an inorganic porous adsorbent having moisture-adsorption characteristics such as zeolite, silica gel, and ion-exchange resin may be used.

The container 19 made of the porous fluorine sheet can pass gas through the container 19 but cannot pass any component of the adsorbent 11 such as particles of the activated carbons, thus preventing, for example, the pollution of the optical system. Any other container having the same effect as the container 19 may be used. The sheet 20 at the bottom of the adsorbent 11 is provided so as to fix the absorbent 11 to an inlet portion of the air hole 12. The sheet 20 is attached to the inlet portion of the air hole 12 in the space 57 with a silicon-free adhesive compound.

The space 57 in which the adsorbent 11 is disposed is hermetically sealed from the outside of the laser holder 2 with a sealing tape 13 made of a flexible or an elastic member. This structure works as a variable volume mechanism.

Figure 2:
FIG. 2 is a cut-away view of an exemplary sealing tape used in the semiconductor laser module.

FIG. 2 is a cut-away diagram of the sealing tape 13 shown in FIG. 1. An adhesive compound 15 is applied to the bottom surface of the sealing tape 13 so that the sealing tape 13 with the adhesive compound 15 is adhered to a curved surface of a member. As examples of the sealing tape 13 made of flexible or elastic member, there are films including polyethylene terephthalate (PET) and a laminated body of PET and aluminum. An adhesive compound is applied to the rear surface of a film layer. A PET film, an aluminum film, and the adhesive compound are made of a silicon-free material so as to prevent the intrusion of pollutants such as siloxane. An elastic member such as rubber may be used as the sealing tape 13 made of an elastic material.

The spaces 56 and 57 in the optical device are in communication with each other via the air hole 12 and the adsorbent 11. The range of the fluctuation of the pressure in the entire spaces in the optical device is reduced by the variable volume mechanism. Since air flow between the space 56 and the space 57 occurs through the absorbent 11, moisture, organic gas, and impurity gas such as siloxane floating in air can easily be adsorbed.

Figure 4:
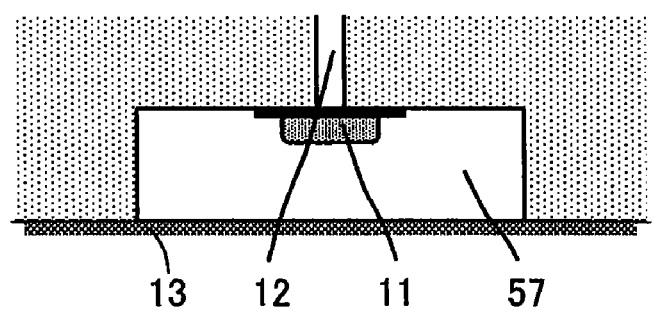
FIGS. 4 through 6 are cut-away views of an exemplary variable volume mechanism used in the semiconductor laser module.
Figure 5:
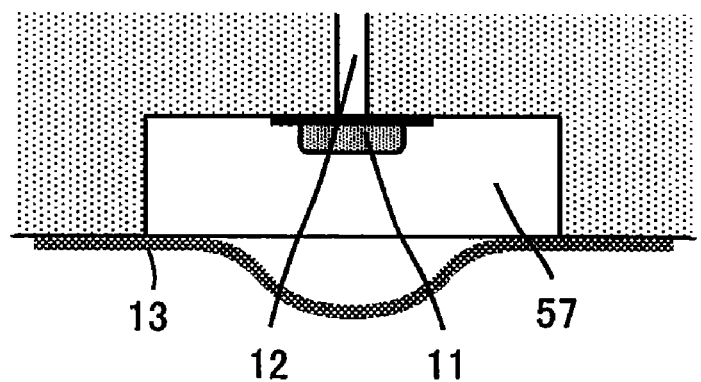
Figure 6:
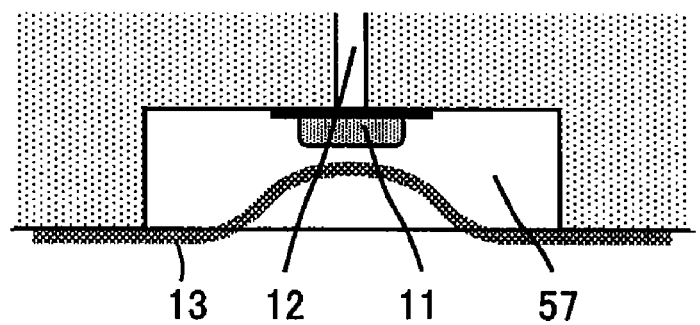

The variable volume mechanism is further described with reference to FIGS. 1, 4, 5, and 6. FIG. 4 shows the sealing tape 13 in a normal condition. When pressure of the space in the semiconductor module becomes higher than that of the outside of the semiconductor module due to the temperature increase of the semiconductor module or pressure difference between the inside and the outside of the semiconductor module, the sealing tape 13 of the variable volume mechanism is swollen outward in a mountain shape as shown in FIG. 5. On the contrary, when the pressure of the space in the semiconductor module becomes lower than that of the outside of the semiconductor module, the sealing tape 13 of the variable volume mechanism is retracted inward in a bowl shape as shown in FIG. 6, thereby reducing the volume of the spaces in the semiconductor module to keep the pressure in the semiconductor module substantially constant.

At the same time, since gas flows between the space 56 and the space 57 through the adsorbent 11, impurity gas in the spaces hermetically sealed in the semiconductor laser module is adsorbed into the adsorbent 11. As a result, the spaces in the semiconductor module are kept clean. Especially, since the adsorbent 11 is disposed in the middle of the gas flow, the efficiency of adsorbing impurity gas becomes higher than in a case where the adsorbent 11 is simply disposed in the space 56. Further, the adsorbent 11 can work as a filter for filtering microscopic dust floating in the spaces. Because of these features, it is possible to effectively prevent pollution at the light condensing spot of laser light at the end of the optical fiber 8 and at a laser beam oscillation part of the semiconductor laser 1 due to the optical tweezer effect of laser light and attachments formed from impurity gas.

As described above, when a single-mode optical fiber for visible light or light having a shorter wavelength than that of visible light is used in an optical system, the optical system is required to be accurately aligned to keep the optical coupling efficiency unchanged. Unfortunately, in a conventional semiconductor laser module, since the internal volume of the optical device is hermetically sealed using a case such that the internal volume is substantially unchanged, the pressure in the optical device increases due to, for example, the temperature increase of the semiconductor module, thereby causing the distortion of the optical system. As a result, highly-accurate alignment cannot be maintained, and the light use efficiency may become unstable. Further, impurity gas may intrude into the semiconductor module through an incompletely sealed portion due to the pressure difference between inside and outside of the optical device. The problems, however, may be solved by the variable volume mechanism according to an embodiment of the present invention that can keep the pressure in the semiconductor module substantially constant.

On the other hand, an adsorbent may be disposed between internal space and outer air so that air flow between the internal space and the outer air is provided though the adsorbent. In this case, the problem of pressure difference between inside and outside of the optical device can be solved. Unfortunately, however, when the semiconductor module is used in an environment containing a higher impurity gas or moisture, the adsorbent may be easily saturated and desired performance cannot be maintained for a long period of time. In the optical device according to an embodiment of the present invention, since an adsorbent is disposed in the sealing tape, the adsorbent is isolated from outer environments, thereby preventing the adsorption of the pollutant of the outer environment. As a result, the service life of the adsorbent is not shortened.

Though the space 57 including the adsorbent 11 is in communication with the space 56 as shown in FIG. 1, the space 57 may be alternatively in communication with the space 58, an hermetically enclosed space in the optical device.

Further, an optical device according to an embodiment of the present invention may be used in a semiconductor laser module using other than a short-wavelength laser, keep the intensity of optical fiber output light substantially constant, and enhance the reliability of the semiconductor laser module.

Embodiment 2

Figure 7:
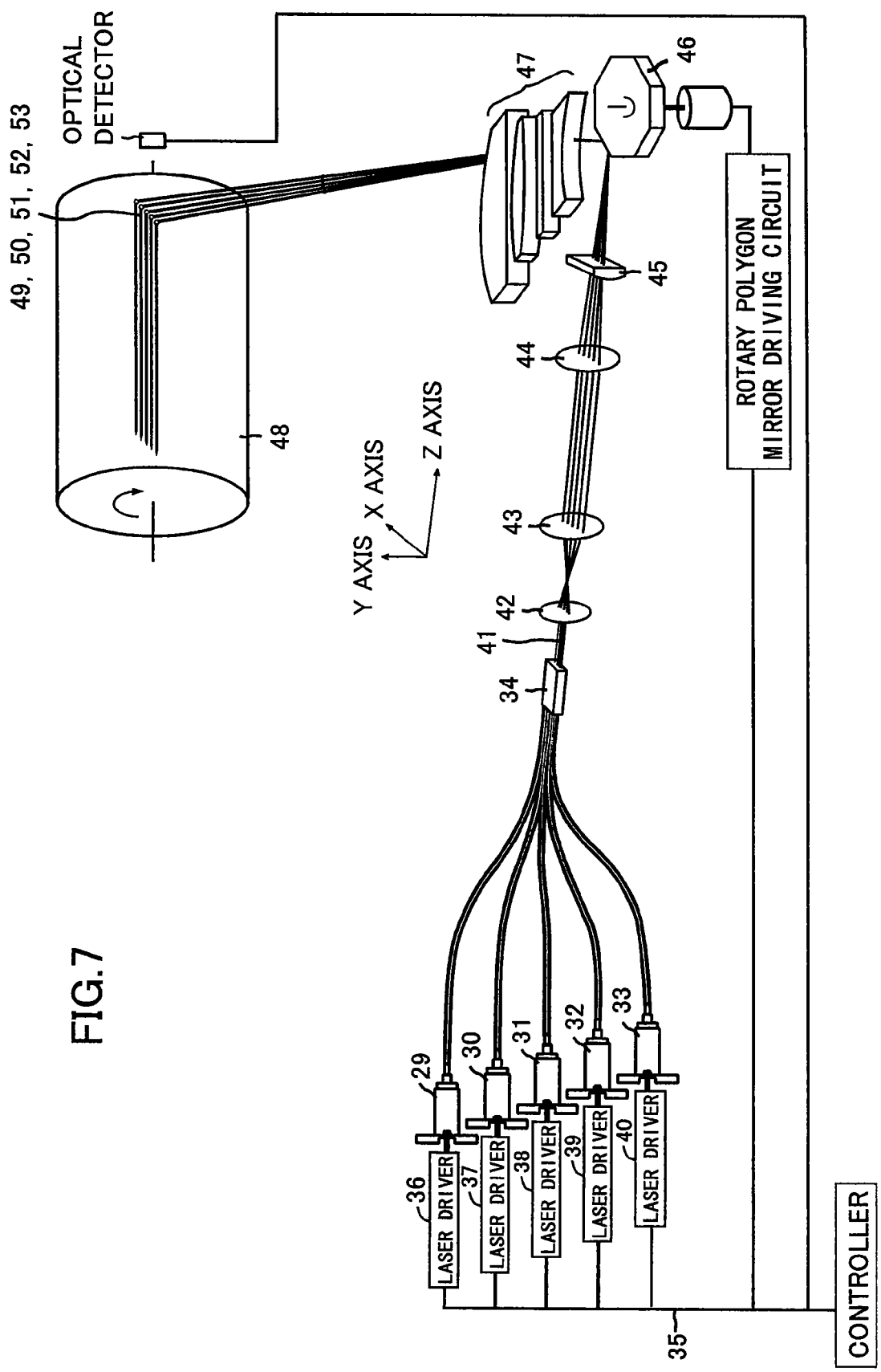
FIG. 7 is a schematic drawing showing an exemplary optical scanning device including the semiconductor laser module.

FIG. 7 shows an optical scanning device including a semiconductor module according to a second embodiment of the present invention. The optical scanning device uses plural semiconductor laser modules described above. As shown in FIG. 7, there is an optical fiber array unit 34 where the laser light output ends of the corresponding semiconductor laser modules 29 through 33 are arranged close to each other in one line. The optical fiber array unit 34 is used as a plural laser beam light source emitting plural laser lights. Each semiconductor laser in the semiconductor laser modules emits a laser beam 41 from the end of the optical fiber array unit 34. The laser beams 41 are separately modulated by driving the laser drivers 36 through 40 based on an image data signal 35 from a controller. Five beams are shown in FIG. 7 for illustrative purposes only.

The laser beams emitted from the optical fiber array unit 34 pass through lenses 43, 44, 45 for forming the beams and are irradiated onto a photosensitive drum 48 in spot lines for imaging light beams by way of a polygon mirror 46 of an optical deflection device and a scanning lens 47 of a scanning optical device. Since high-intensity and stable laser light can be obtained in an optical scanning device including a semiconductor module according to an embodiment of the present invention, the optical scanning device can be used as a device having longer service life and higher accuracy.

Embodiment 3

Figure 8:
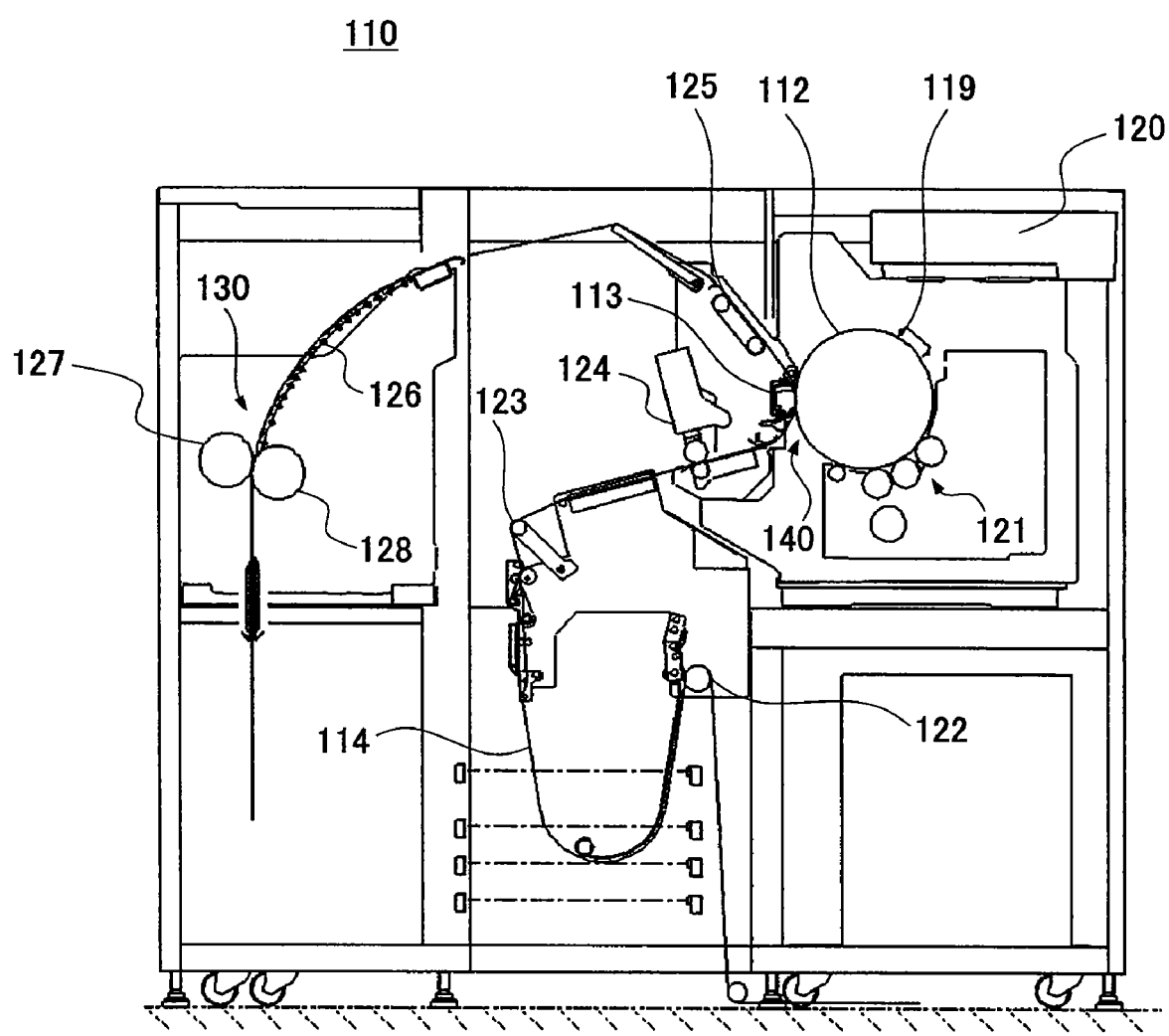
FIG. 8 is a schematic drawing showing an exemplary image forming apparatus including the optical scanning device.

The optical scanning device can be preferably used in an image forming apparatus including a printer, a copy machine, and a facsimile device. FIG. 8 shows an image forming apparatus including an optical scanning device according to a third embodiment of the present invention. In an image processing apparatus 110 of FIG. 8, a laser light signal from a light scanning device 120 is irradiated onto a photosensitive drum 112 charged by a charger 119 to form a latent image on the photosensitive drum 112. The irradiation of the laser light signal from the optical scanning device 120 is described above. The photosensitive drum 112 on which the latent image is formed rotates in the clockwise direction, and the latent image is developed with toner in a developing unit 121 to form a toner image. The toner image is transferred onto a web 114 (a recording medium) in a transferring section 140. The web 114 is transferred by conveyor rollers 122 through 125 from, for example, a paper tray, pressed onto the photosensitive drum 112 in the transferring section 140 to transfer the toner image on the photosensitive drum 112, and transferred to a fixing section 130. The toner image on the web 114 is fixed in the fixing section 130 to finish forming an image on the web 114. On the other hand, the photosensitive drum 112 that has transferred the toner image onto the web 114 continuously rotates to be charged by the charger 119 and the next latent image from irradiation of the optical scanning device 120 is formed on the photosensitive drum 112 again. In this manner, developing and transferring the toner image are repeated. Since the web 114 is continuously supplied from, for example, the paper tray, images on webs 114 can be continuously formed. Since the image forming apparatus 110 includes an optical scanning device according to an embodiment of the present invention, a high quality image can be formed with high reliability.

The present invention is not limited to the above-mentioned embodiments, and variations and modifications may be made without departing from the scope of the present invention.

The present application is based on and claims the benefit of priority of Japanese Patent Application No. 2006-337281, filed on Dec. 14, 2006, the entire contents of which are hereby incorporated by reference.

What is claimed is:

1. An optical device comprising:
a lens system unit configured to condense a laser light emitted from a semiconductor laser and guide the laser light onto an incident end of an optical fiber;
a variable volume mechanism unit defining an hermetically enclosed space and capable of altering a volume of the hermetically enclosed space; and
an adsorbent unit disposed in the hermetically enclosed space, wherein
either the incident end of the optical fiber or the lens system unit or both are in contact with the hermetically enclosed space including the adsorbent unit.

2. The optical device according to claim 1, wherein
the hermetically enclosed space includes a first space defined by either the incident end of the optical fiber or the lens system unit or both, and a second space defined by the variable volume mechanism unit, the first space and the second space being separated by the adsorbent unit.

3. The optical device according to claim 1, wherein
the variable volume mechanism unit is a wall surface made of a flexible member or an elastic member, and the wall surface defines the hermetically enclosed space.

4. The optical device according to claim 3, wherein
the flexible or the elastic member is a sealing tape.

5. The optical device according to claim 4, wherein
the sealing tape is made of polyethylene terephthalate (PET) or a laminated body including PET and aluminum.

6. The optical device according to claim 3, wherein
the flexible or the elastic member is attached to the wall surface defining the hermetically enclosed space with a silicon-free adhesive.

7. The optical device according to claim 1, wherein
the adsorbent unit adsorbs a trace impurity decomposed by or reacted with the laser light in the hermetically enclosed space.

8. The optical device according to claim 1, wherein
the adsorbent unit adsorbs gas decomposed or reacted to generate carbons or a carbon compound.

9. The optical device according to claim 1, wherein
the adsorbent unit adsorbs silicon compound gas.

10. The optical device according to claim 1, wherein
the adsorbent unit has a dehumidification function.

11. The optical device according to claim 1, wherein
the adsorbent unit includes activated carbons or activated carbons containing a dehumidification agent.

12. The optical device according to claim 1, wherein
the adsorbent unit is contained in a case having air permeability.

13. The optical device according to claim 1 further comprising:
a laser holder holding the semiconductor laser; and
an optical fiber holder including
a ferrule holding the optical fiber; and
a sleeve holding the ferrule.

14. A semiconductor laser module comprising:
a semiconductor laser;
an optical fiber; and
the optical device according claim 1, condensing a laser light emitted from the semiconductor laser and guiding the laser light onto the incident end of the optical fiber.

15. The semiconductor laser module according to claim 14, wherein a laser light emitting section and the optical device are formed into an integrated structure.

16. The semiconductor laser module according to claim 14, wherein:
the wavelength of the laser light emitted from the semiconductor laser is 450 nm or less.

17. An optical scanning device comprising:
an optical fiber array unit in which plural laser light output ends of optical fibers from a semiconductor laser module are arranged;
an optical deflection device deflecting and scanning the laser lights emitted from the optical fiber array;
a scanning optical system unit scanning and forming an image on a scanning surface from the laser lights deflected and scanned by the optical deflection device; and
the semiconductor laser module according to claim 14.

18. An image forming apparatus comprising:
the optical scanning device according to claim 17.

* * * * *